United States Patent

Mege et al.

[11] Patent Number: 5,598,603
[45] Date of Patent: Feb. 4, 1997

[54] WINDSCREEN WIPER ARM WITH IMPROVED MEANS FOR LONGITUDINAL IMMOBILIZATION OF THE REINFORCED BLADE

[75] Inventors: Bernard Mege, Clermont-Ferrand; Jean-Luc Sortais, Beaumont, both of France

[73] Assignee: Valeo Systemes D'Essuyage, La Verriere, France

[21] Appl. No.: 535,229

[22] PCT Filed: Feb. 23, 1995

[86] PCT No.: PCT/FR95/00214

§ 371 Date: Oct. 27, 1995

§ 102(e) Date: Oct. 27, 1995

[87] PCT Pub. No.: WO95/23714

PCT Pub. Date: Sep. 8, 1995

[30] Foreign Application Priority Data

Mar. 1, 1994 [FR] France ................................ 94 02430

[51] Int. Cl.⁶ ...................................................... B60S 1/38
[52] U.S. Cl. ................. 15/250.454; 15/250.451
[58] Field of Search ......................... 15/250.44, 250.451, 15/250.452, 250.453, 250.454, 250.48, 250.46, 250.39, 250.31

[56] References Cited

U.S. PATENT DOCUMENTS 2,782,443  2/1957  Krohm ................. 15/250.452

FOREIGN PATENT DOCUMENTS

| 158070 | 10/1985 | European Pat. Off. ........... 15/250.453 |
| 461987 | 12/1991 | European Pat. Off. ........... 15/250.453 |
| 2502087 | 9/1982 | France . |
| 2605272 | 4/1988 | France ............................ 15/250.453 |
| 4228284 | 3/1993 | Germany ........................ 15/250.453 |
| WO93/14958 | 5/1993 | Germany . |

Primary Examiner—Gary K. Graham
Attorney, Agent, or Firm—Morgan & Finnegan, L.L.P.

[57] ABSTRACT

The invention concerns a windscreen wiper blade assembly, with a wiper blade on which a connecting flange is connected to a component of a support structure for the wiper blade, which includes an open connecting ring substantially in the form of an inverted U which straddles the flange, and of the type in which the flange has at least one longitudinal groove which receives a reinforcing rib produced in the form of a horizontal reinforcing plate, one outer lateral edge of which has a locking notch designed to receive a locking member, characterised in that the vertical leg of the connecting ring includes a housing which is open in the direction of the outer lateral edge of the rib and which receives a vertical locking finger which partially projects transversely into the opening in the housing in order to be received in the locking notch of the rib.

11 Claims, 3 Drawing Sheets

WINDSCREEN WIPER ARM WITH IMPROVED MEANS FOR LONGITUDINAL IMMOBILIZATION OF THE REINFORCED BLADE

BACKGROUND OF THE INVENTION

The present invention concerns a windscreen wiper blade assembly, notably for motor vehicles.

The invention concerns more particularly a windscreen wiper blade assembly with a wiper blade on which a top longitudinal connecting flange is connected to a component of a support structure for the wiper blade, such as, for example, a cross-member of an articulated support structure, which includes an open connecting ring, also referred to as a connecting claw, substantially in the form of an inverted U which straddles the flange and each of whose vertical legs is extended by a transverse lug which is received under a bottom horizontal face of the flange, and of the type in which the flange has at least one longitudinal groove formed in a vertical lateral face of the flange and which receives a reinforcing rib produced in the form of a horizontal reinforcing plate, one outer lateral edge of which has a locking notch designed to receive a member for locking the component of the support structure in the longitudinal position with respect to the rib.

An example of such a design for a windscreen wiper blade assembly is described and depicted in the document FR-A-2 502 086, in which the locking notch formed in the lateral edge of the rib is delimited by two stop lugs produced by means of cutting out, which project transversely outwards with respect to the overall plane of the outer longitudinal edge of the rib.

Apart from the complexity of the cutting out to be effected in the rib and the need to deform the stop lugs outwards after the cutting out has taken place, this design has the drawback of making it necessary to deform elastically the vertical legs of the connecting claw slightly away from each other when the flange is inserted by means of longitudinal sliding in the claw until the vertical leg passes the ramp formed by the first retaining lug that it meets so as then to be embedded elastically in the notch. This phenomenon of deformation of the claw is accentuated where the wiper blade is of symmetrical design with respect to a vertical mid-plane, the two ribs having locking notches arranged longitudinally opposite each other.

Moreover, the design described in this document makes the wiper blade particularly difficult to remove, in order to be replaced, in so far as the operator must compress the retaining lugs transversely inwards in order to make the longitudinal extraction of the wiper blade, by sliding the upper flange between the vertical legs of the connecting claw, possible again.

A design for a windscreen wiper arm is also known from the document FR-A-2 215 048, in which the locking notches formed in the longitudinal reinforcing ribs are very simple in shape and have no elastically deformable retaining lug projecting transversely.

In this design, the longitudinal immobilisation of the rib with respect to the flange is ensured by means of an intermediate bracket which is positioned vertically on the flange and which requires cut-outs or slots to be produced in the material forming the body of the flange opposite the locking notches formed in the outer lateral edge of the reinforcing rib. Moreover, the positioning of the claw in the form of an open ring of the connecting cross-member is still effected by passing over the elastically deformable lugs arranged on the intermediate locking bracket, the design of the latter being particularly complex and the removal operations again being made difficult by the need to deform elastically the locking lugs formed on the outside of the locking bracket.

SUMMARY OF THE INVENTION

The aim of the present invention is to propose a novel design for a windscreen wiper blade assembly whose means of relative longitudinal immobilisation of the connecting claw with respect to the reinforcing ribs enable the drawbacks that have just been mentioned to be overcome.

To this end, the invention proposes a windscreen wiper blade assembly of the type mentioned above, characterised in that the vertical leg of the connecting ring includes a housing which is open in the direction of the outer lateral edge of the rib and which receives a vertical locking finger which partially projects transversely into the opening in the housing in order to be received in the locking notch of the rib.

According to other characteristics of the invention:

- the upper connecting flange is produced from an elastically deformable material and the outer lateral edge of the rib is flush with the vertical lateral face of the flange;
- the locking finger forms one of the two vertical legs of a locking bracket in the form of an inverted U, which straddles the body of the connecting ring;
- the upper connecting flange has two reinforcing ribs arranged symmetrically with respect to a vertical midplane of symmetry of the wiper blade, each of which has a locking notch;
- the locking notches of the two reinforcing ribs are arranged longitudinally, facing each other, the connecting ring has a symmetry of design with respect to a longitudinal mid-plane, and each of the two vertical legs of the locking bracket is received in an open housing formed in one of the two vertical legs of the connecting ring;
- each of the vertical legs of the locking bracket is extended by a transverse lug which is received under the transverse lug of the corresponding vertical leg of the connecting ring;
- each open housing formed in a vertical leg of the connecting ring is defined longitudinally by two outer vertical ribs;
- the locking bracket is elastically deformable, to enable it to be positioned on the connecting ring by separating these vertical legs;
- the lateral vertical face of the upper connecting flange has a recess arranged opposite the locking notch in the reinforcing rib in which the said part of the locking finger which is received in the locking notch is received.

Other characteristics and advantages of the invention will emerge from a reading of the detailed description that follows, for an understanding of which reference will be made to the accompanying drawings in which:

DETAILED DESCRIPTION OF THE PREFERRED EMBODIMENTS

Figure 1:
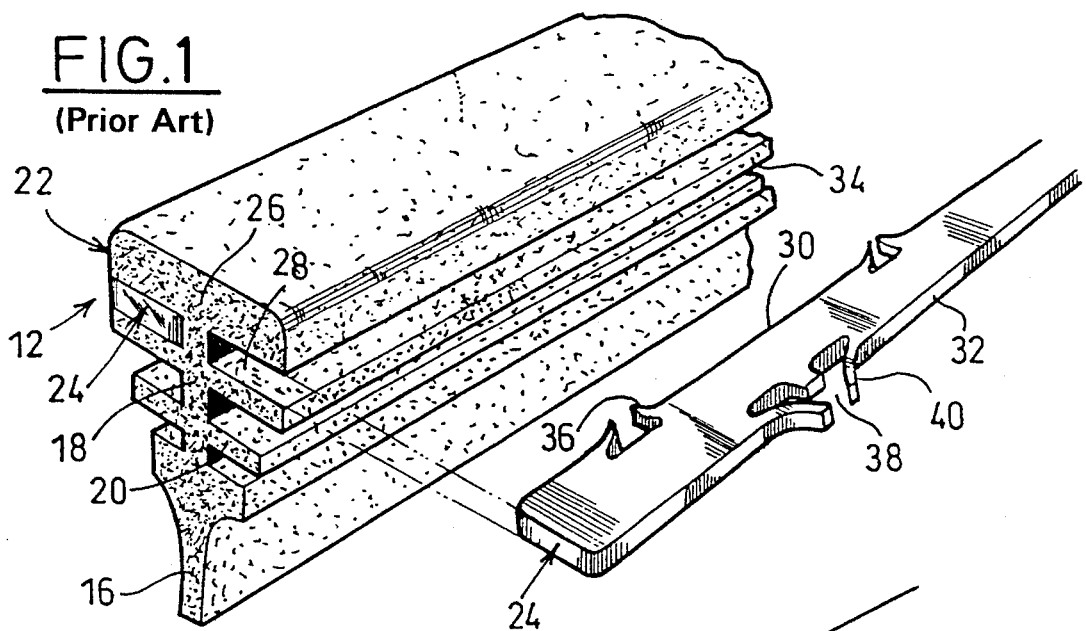
FIG. 1 is a diagrammatic, partially exploded perspective view of a section of a wiper blade produced in accordance with the teachings of the art.
Figure 2:
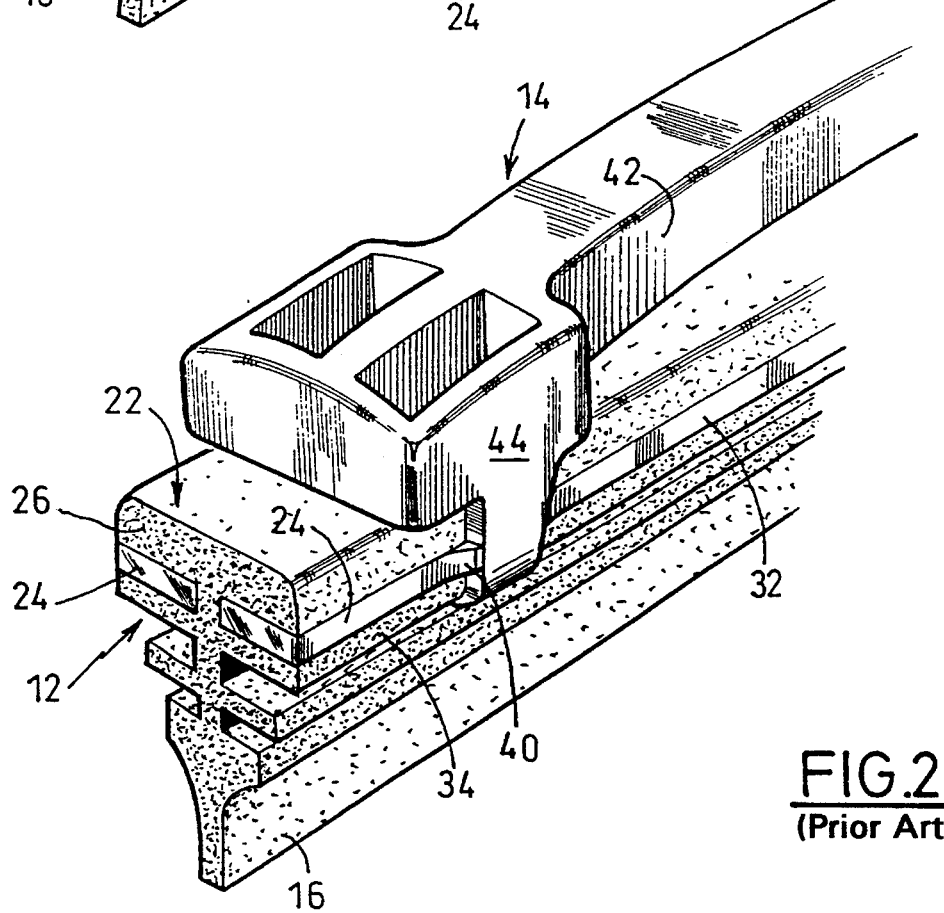
FIG. 2 is a view similar to that of FIG. 1, illustrating the wiper blade in the mounted position and immobilized longitudinally in an end claw of a connecting cross-member of an articulated support structure belonging to a windscreen wiper blade assembly.

In FIGS. 1 and 2, a part of a windscreen wiper blade assembly, which consists essentially of a wiper blade 12 and a secondary cross-member 14, belonging to an articulated support structure for the wiper blade 12, will be recognized.

The blade 12 has a wiper edge 16 which is designed to cooperate, during normal use, with the window to be wiped and which is connected by a web 18 and wings 20 to a connecting flange 22 reinforced by two metal reinforcing ribs 24.

With the exception of the ribs 24, the whole of the blade 12 is produced in the form of a profiled element made of rubber or elastomer.

The longitudinal top connecting flange 22 is, in cross section, substantially rectangular in shape, and its solid body made of elastomer 26 has two horizontal longitudinal grooves 28 opposite each other, which are arranged symmetrically with respect to the vertical mid-plane of symmetry of the wiper blade 12.

The dimensions of each of the longitudinal grooves 28 in the flange 12 are such that, when the rib 24 is in place in a groove 28, its inner lateral edge 30 bears against the bottom of the groove 28 and its outer lateral edge 32 is flush with the vertical lateral face 34 of the body 22 of the flange 12.

According to a known design of the prior art, described and depicted in the document FR-A-2 502 086, the inner lateral edge 30 of each rib 24 has teeth 36 for hooking the rib in the middle connecting strip 18, and the outer lateral edge 32 of each rib has a notch 38, which is cut out from the rib in the form of a metal plate 24 and which defines two immobilization lugs 40 which project transversely outwards with respect to the plane common to the outer lateral edge 32 and vertical lateral face 34.

In this design, according to the prior art, the main longitudinal leg 42 of the yoke 14 terminates in an end 44, also referred to as a claw, in the form of a ring open vertically downwards, which is, in cross section, in the shape of an inverted U, and each one of whose vertical lateral legs 46 is of such a width that it can be received in a corresponding immobilization notch 38 formed in a rib 24.

As was explained above, the blade 12 is positioned by introducing, by means of longitudinal sliding, the top connecting flange 22 between the vertical legs 46 of the claw 44 until the said legs enter, following elastic deformation, the notches 38.

The ribs 24, which are immobilized with respect to the flange 22, thus ensure indirectly the longitudinal immobilization of the blade 12 with respect to the cross-member 42.

The embodiment of the invention illustrated in FIGS. 3 to 6, in which components identical or similar to those illustrated in FIGS. 1 and 2 are designated by the same reference numerals, will now be described.

Figure 3:
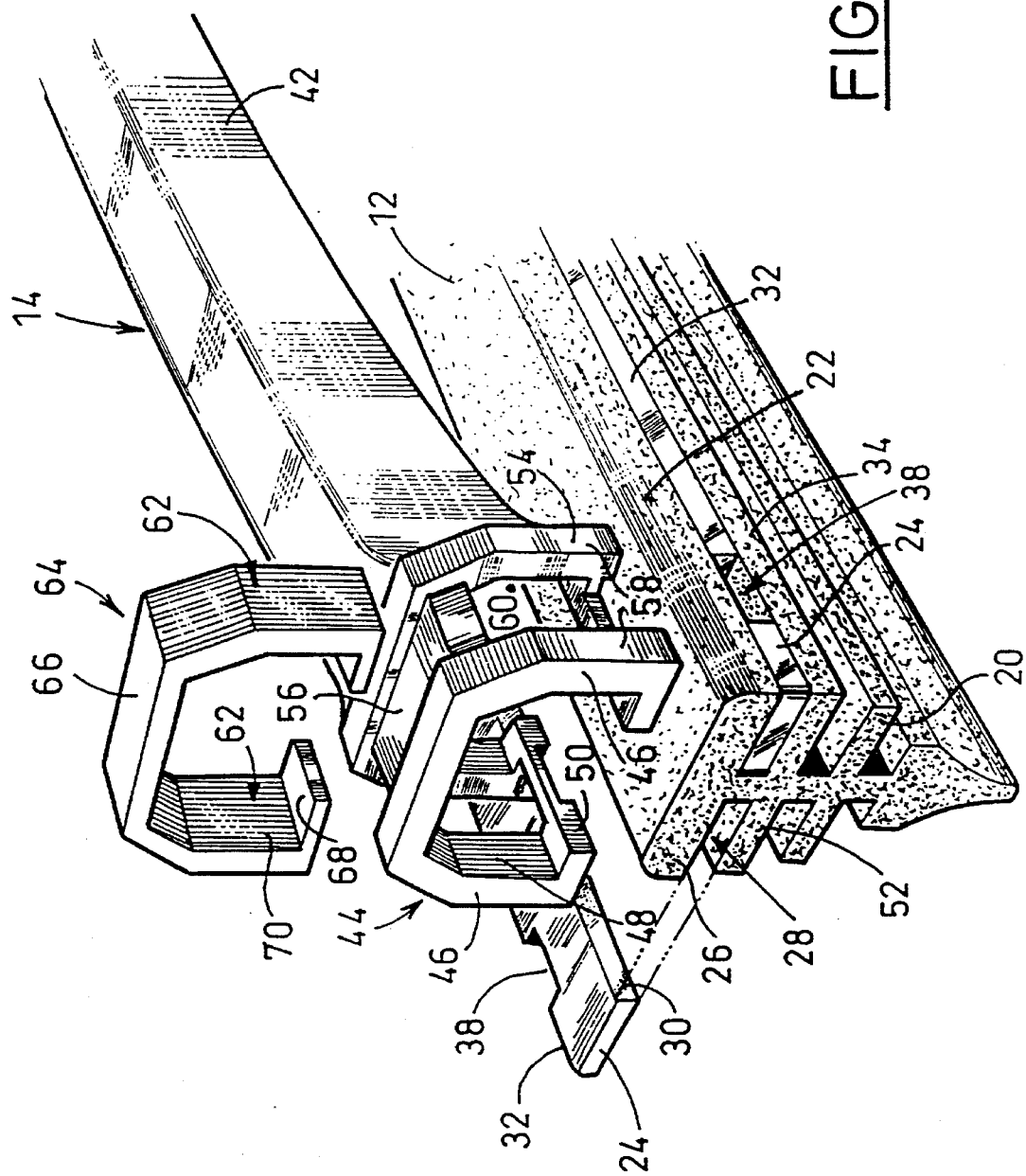
FIG. 3 is an exploded perspective view similar to that of FIGS. 1 and 2, which illustrates the principal components of a windscreen wiper blade assembly produced in accordance with the teachings of the invention.
Figure 5:
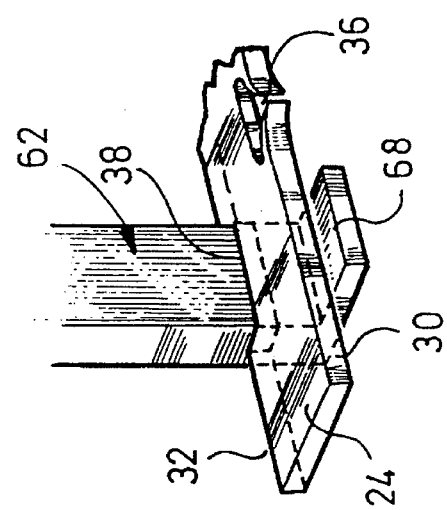
FIG. 5 is a diagrammatic perspective detail view, illustrating the cooperation of a vertical leg of the locking bracket received in a locking notch of a reinforcing rib.

As can be observed, notably in FIGS. 3 and 5, the outer lateral edge 32 of each reinforcing rib 34 here has a locking notch 38 which is formed by a simple rectangular cut-out which extends inside the rib without any complementary locking lug.

In the position in which it is mounted in its corresponding groove 28, each rib 24 is situated entirely in the groove and its outer lateral edge 32 is flush with the vertical lateral surface 34 of the body 26 of the flange 22.

The claw 44 of the cross-member 14 has two parallel vertical legs 46 opposite each other, the legs include outer vertical faces 58 and facing inner parallel vertical faces 48 which are separated by a distance corresponding substantially to the width of the top connecting flange 22 separating the vertical lateral faces 34, so as to enable the flange 22 to be inserted by sliding freely into the claw 44.

Each of the vertical legs 46 is extended, at its bottom end, by a horizontal transverse lug 50 which is received slidingly under the lower horizontal face 52 of the body 26 of the flange 22 so as to guide the sliding of the flange inside the claw 44 and retain the wiper blade in the vertical direction.

The claw 44 has two parallel external peripheral ribs 54 which are connected to each other at the top by a horizontal partition forming a bridge 56.

The vertical legs 46 of the ribs 54 define longitudinally, between them, a housing 60 which is open laterally outwards and, secondly, inwards through the vertical legs 46 in the direction of the vertical lateral face 34 of the flange 22 and of the longitudinal edge 32 of the corresponding rib including the notch 38.

The housing 60 is also extended vertically downwards in the horizontal lug 50.

Each housing 60 is designed to receive a vertical locking finger formed by a vertical leg in the form of a rectangular lug 62 belonging to a locking bracket 64.

The locking bracket 64 is substantially in the form of an inverted U whose two vertical legs 62 are connected by a horizontal bridge 66 which is designed to bear against the bridge 56 of the claw 44.

Each vertical leg in the form of a lug with a rectangular cross section 62 has dimensions which are complementary to those of the housing 60, and is designed to be received between the vertical legs 46 of the ribs 54.

Each locking leg 62 is extended at its bottom by a transverse lug 68 which is designed to be received in the bottom part of the housing 60 below the lug 50 of a corresponding vertical leg 46.

In the mounted position of the locking bracket 64, in which it straddles the claw 44, each vertical locking leg 62 of the locking bracket 64 projects transversely inwards beyond the inner face 48 of the corresponding leg 46 of the claw 44, to enter the opposite notch 38 formed in the outer lateral edge 32 of the rib, whose width is, of course, greater than the width of the lug 50.

Figure 4:
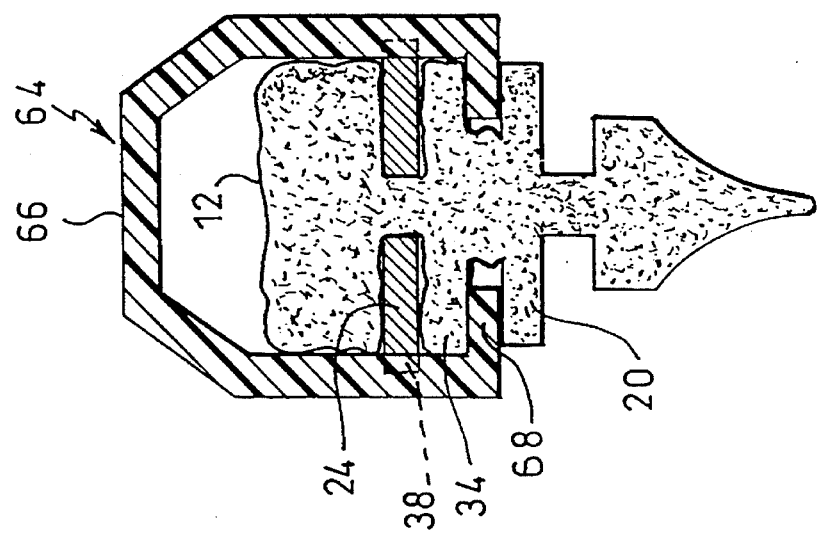
FIG. 4 is a view in cross section along a vertical plane passing through a mid-plane of the bracket and of locking illustrated in FIG. 3, in which the various components are illustrated in their mounted position.

By virtue of these dimensions, and notably of the width separating the opposite inner faces 70 of the vertical legs 62, which is less than the width of the flange separating its vertical lateral faces 34, the locking bracket 64 ensures, in its mounted position, a lateral inward compression of the elastomer forming the flange, as is illustrated in FIG. 4, so as to enable the legs 62 to enter the notches 38.

Figure 6:
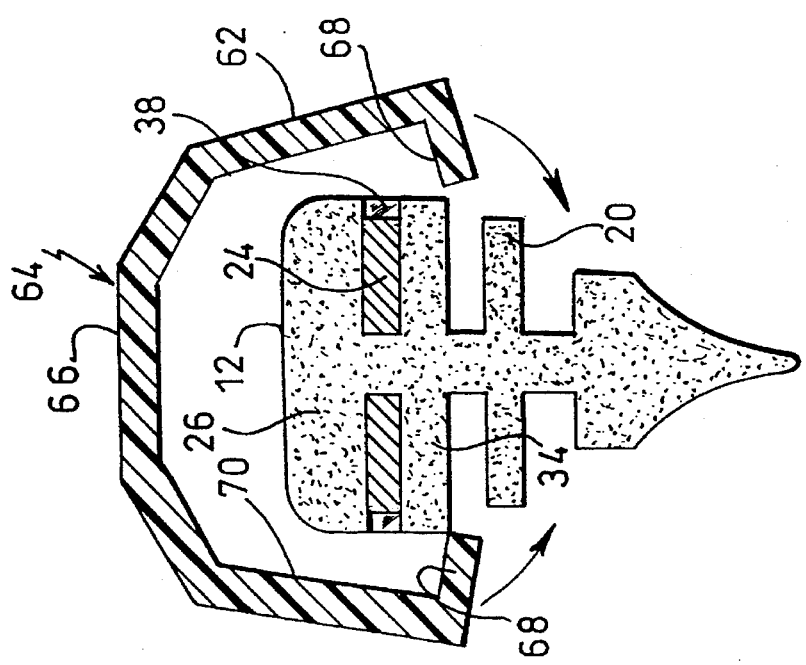
FIG. 6 is a diagrammatic view in cross section similar to that of FIG. 4, illustrating the fitting of the locking bracket by means of the elastic deformation of its legs.

As has been illustrated in FIG. 6, the fitting of the locking bracket 64, after the flange 22 has been inserted by sliding into the claw 44, until the holes 60 formed in the legs 46 of the latter are facing the notches 38, takes place by means of the elastic deformation of the bracket, while separating the legs 62 and lugs 68 in order to insert it vertically between the ribs 54 on the claw 44 which it straddles, and until, under the effect of the elastic return exerted by the previously deformed material, the bottom transverse lugs 68 are positioned under the bottom transverse lugs 50 of the legs 46.

In the embodiment illustrated in FIGS. 3 to 6, it has been indicated that each rib 24 had on its inner lateral edge 30 a pair of teeth 36, as is the case in FIGS. 1 and 2, so as to immobilize the rib 24 longitudinally with respect to the top flange 22.

It is possible to omit the teeth 36 if the transverse gripping force exerted by the legs 62 of the bracket 64 on the elastically deformable material of the flange 22 is sufficient, the locking bracket 64 then ensuring simultaneously the relative fixing in the longitudinal position of the claw 44 and of the flange 12 and of the ribs 24.

According to another variant of the invention, which is not depicted in the Figures, it is also possible to provide, in the lateral faces 34 of the flange 22, recesses or slots arranged longitudinally opposite the notches 38 and which the legs 62 of the locking bracket 64, which ensure simultaneously the immobilization and the precise relative longitudinal positioning of the claw 44 with respect to the ribs 24 and flange 22, can then enter.

The locking bracket 64 is produced from an elastically deformable material which provides a gripping effect, from metal or from plastic, and it enables the wiper blade 12 to be removed very easily, since the locking bracket 64 needs simply to be removed, while separating the vertical legs 62 so that it is possible to again slide the flange 52 freely inside the claw 44.

We claim:

1. A windscreen wiper blade assembly comprising; a wiper blade which includes a top longitudinal connecting flange connected to a component of a support structure for the wiper blade, the component of the support structure having an open connecting ring substantially in the form of an inverted U which straddles the flange, the connecting ring having a plurality of vertical legs, each of the vertical legs being extended by a transverse lug which is received under a bottom horizontal face of the flange, the flange having at least one longitudinal groove formed in a vertical lateral face of the flange receiving an elongated horizontal reinforcing rib, said rib having an outer lateral edge having a locking notch therein receiving a member for locking the component of the support structure in a longitudinal position with respect to the reinforcing rib, characterized in that each of the vertical legs of the connecting ring defines a housing having an opening in a direction of the outer lateral edge of the reinforcing rib, each housing receiving a vertical locking finger of the locking member which partially projects transversely into the opening of the housing and is received in the locking notch of the reinforcing rib.

2. A windscreen wiper blade assembly according to claim 1, characterized in that the top connecting flange is produced from an elastically deformable material, and in that the outer lateral edge of the rib is flush with the vertical lateral face of the flange.

3. A windscreen wiper blade assembly according to claims 1 or 2, characterized in that the locking finger forms one of two vertical legs of a locking bracket in the form of an inverted U which straddles a body of the connecting ring.

4. A windscreen wiper blade assembly according to claim 3, characterized in that each of the vertical legs of the locking bracket is extended by a transverse lug which is received under the transverse lug of a corresponding vertical leg of the connecting ring.

5. A windscreen wiper blade assembly according to claim 4, characterized in that each housing formed in each vertical leg of the connecting ring is defined longitudinally by two outer vertical ribs, and in that the locking bracket is elastically deformable to enable it to be fitted on the connecting ring by separating its vertical legs.

6. A windscreen wiper blade assembly according to claim 1, characterized in that the top connecting flange has two reinforcing ribs arranged symmetrically with respect to a vertical mid-plane of symmetry of the wiper blade, each of the reinforcing ribs having a locking notch.

7. A windscreen wiper blade assembly according to claim 6, characterized in that the locking finger forms one of two vertical legs of a locking bracket in the form of an inverted U which straddles a body of the connecting ring, the locking notches of the two reinforcing ribs being arranged longitudinally, facing each other, in that the connecting ring has a symmetry of design with respect to a longitudinal mid-plane of the connecting ring, and in that each of the vertical legs of the locking bracket is received in the housing defined by a corresponding vertical leg of the connecting ring.

8. A windscreen wiper blade assembly according to claim 7, characterized in that each of the vertical legs of the locking bracket is extended by a transverse lug which is received under the transverse lug of a corresponding vertical leg of the connecting ring.

9. A windscreen wiper blade assembly according to claim 8, characterized in that each housing formed in each vertical leg of the connecting ring is defined longitudinally by two outer vertical ribs, and in that the locking bracket is elastically deformable to enable it to be fitted on the connecting ring by separating its vertical legs.

10. A windscreen wiper blade assembly according to claim 1, characterized in that each housing formed in each vertical leg of the connecting ring is defined longitudinally by two outer vertical ribs.

11. A windscreen wiper blade assembly according to claim 1, characterized in that the lateral vertical face of the top connecting flange has a recess arranged opposite the locking notch in the reinforcing rib in which a part of the locking finger which is received in the locking notch is received.

* * * * *